United States Patent [19]

Starkweather

[11] 4,441,851

[45] Apr. 10, 1984

[54] WRECKER ATTACHMENT

[75] Inventor: Robert G. Starkweather, E. Amherst, N.Y.

[73] Assignee: Escort Systems, Inc., Amherst, N.Y.

[21] Appl. No.: 317,066

[22] Filed: Nov. 2, 1981

[51] Int. Cl.³ ............................................. B60P 3/12
[52] U.S. Cl. .................................... 414/563; 212/180
[58] Field of Search ......................... 414/563; 280/800; 212/180, 181; 254/323, 325, 326, 327

[56] References Cited

U.S. PATENT DOCUMENTS

| 3,580,611 | 5/1971 | McNitt | 280/800 X |
| 3,888,368 | 6/1975 | Hawkins . | |
| 4,183,709 | 1/1980 | Morrow | 414/563 |
| 4,269,396 | 5/1981 | Easterwood . | |
| 4,274,791 | 6/1981 | Moon . | |

Primary Examiner—Robert G. Sheridan

Attorney, Agent, or Firm—Bean, Kauffman & Bean

[57] ABSTRACT

A wrecker attachment in kit form for mounting on the bed of a truck in rigid relationship with its underlying frame. The wrecker attachment includes a back post assembly for mounting a boom assembly, a floor plate assembly for bracing the back post assembly and positionally locating same on the truck bed, and mounting plate assemblies for clamping the back post and floor plate assemblies relative to the truck bed and rigidly securing same to the truck frame. The construction and method of assembling the wrecker attachment allows same to be accommodated for use with trucks having differing spacings between the channels comprising their frames and/or between such frames and the under side of their beds, as well as for inaccuracies in alignment or centering of such attachment relative to the frame of any given truck.

5 Claims, 5 Drawing Figures

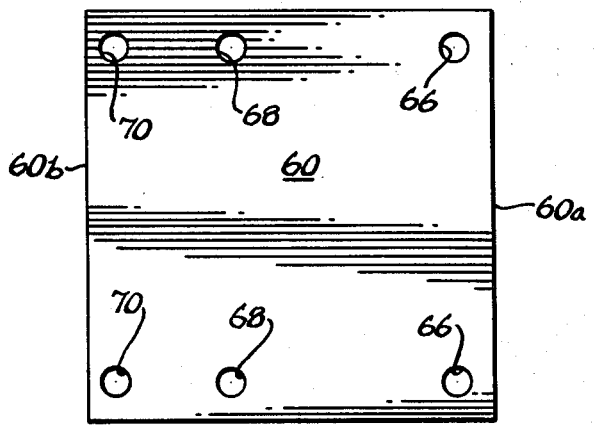
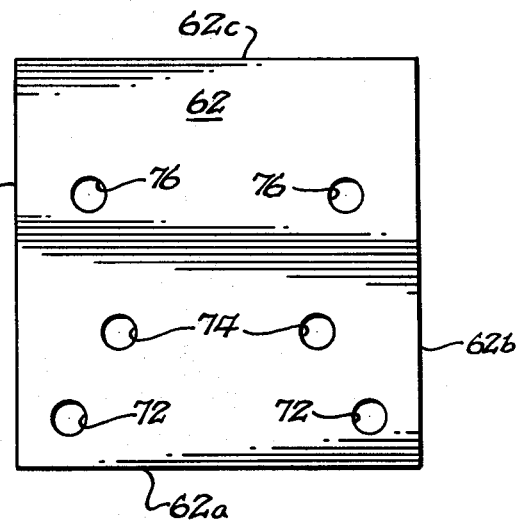
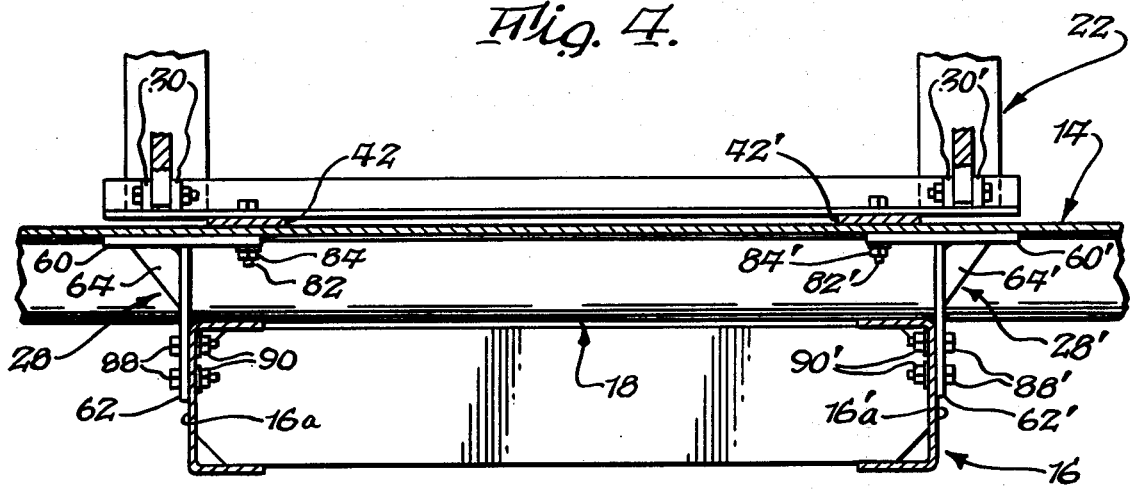
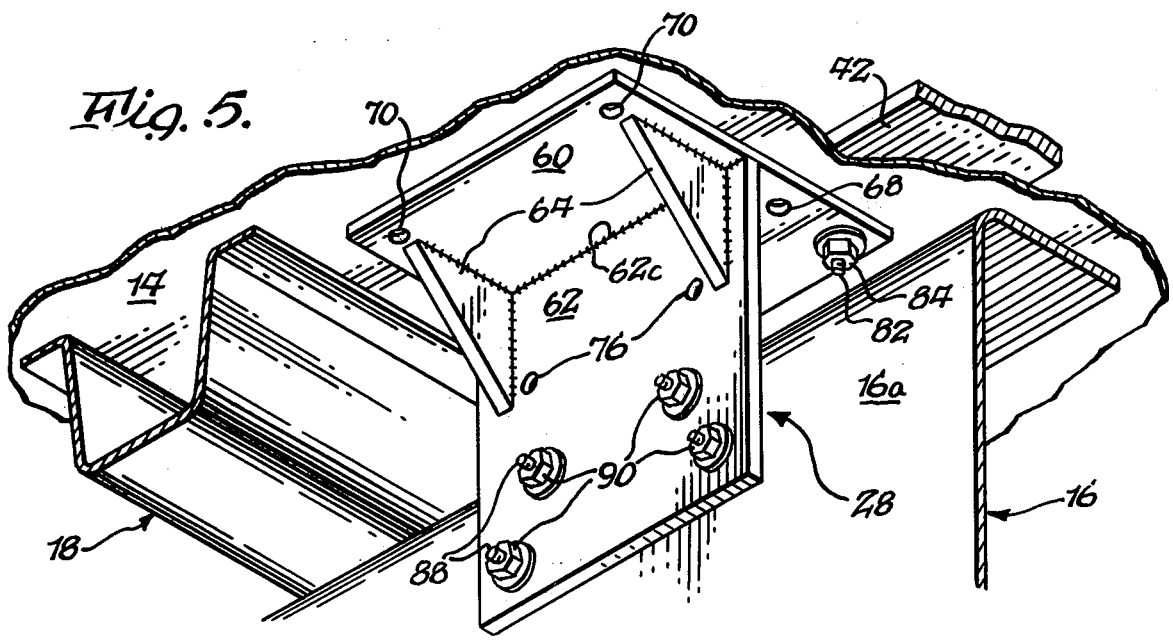

WRECKER ATTACHMENT

BACKGROUND OF THE INVENTION

Heretofore, wreckers have for the most part been marketed as special purpose trucks, or have required dealer fabrication or assembly of wrecker apparatus on existing heavy duty trucks. Each of these types of wreckers is rather expensive and as a result, small service stations and garages having light duty and relatively infrequent towing requirements find it difficult to justify the purchase of such wreckers.

With a view towards providing a wrecker of light duty towing capacity at a price affordable by small service stations and garages, it has been proposed to provide various types of wrecker attachments adapted to be mounted on pickup trucks for the purpose of converting same into light duty wreckers. One such wrecker attachment is disclosed in U.S. Pat. No. 3,888,368, wherein it is proposed to provide a base supporting member fabricated from a plurality of telescopically associated members fitted with holes adapted to receive for attachment mounting purposes bolts commonly used for securing the bed of a pickup truck to its frame. This construction has the advantage of permitting the wrecker attachment to be directly fixed to the frames of trucks of differing construction. However, drawbacks of this prior wrecker attachment would appear to be the complexity and resultant cost of fabricating its base support member, and the liklihood that the frictional coupling provided between its telescopically associated members will eventually allow undesired relative movement of such members with resultant displacements of the wrecker attachment relative to the truck bed during use. Also, the bolts typically employed for mounting a bed on the frame of a pickup truck are not designed to withstand the shear and/or tension loadings expected to be imposed thereon, during use of such truck as a wrecker.

A light duty wrecker attachment for pickup trucks has also been disclosed in U.S. Pat. No. 4,269,396. This wrecker attachment has the advantage over that described in the above patent of permitting mounting/dismounting thereof relative to a truck, without requiring disassembly of its bed relative to its frame. However, this latter wrecker attachment is believed to have the decided disadvantage of not being firmly secured to the truck frame during use.

SUMMARY OF THE INVENTION

The present invention is directed towards an improved wrecker attachment and method for mounting same on the bed of a pickup truck or the like in a securely attached relationship relative to the frame of such truck.

The present wrecker attachment is particularly adapted for shipment to a point of use in a kit or knockdown form and may be readily installed on a pickup truck by tools normally available at a small garage or service station.

The attachment generally includes a boom assembly, a back post assembly for use in mounting the boom assembly, a floor plate assembly for use in positionally locating and bracing the back post assembly relative to a truck bed, and mounting plate assemblies for use in clamping the back post and floor plate assemblies relative to the truck bed and rigidly securing same relative to the truck frame. The construction and mode of assembly/mounting of the present wrecker attachment allows same to be accommodated for use with trucks having differing spacing between the channels typically comprising their frames and/or between such frames and the under side of their beds, as well as for inaccuracies in alignment or centering of such attachment relative to the frame of any given truck. The present wrecker attachment additionally possesses advantages with regard to the provision of support for the truck bed in areas thereof not directly supported by truck bed mounting weldments, such that the overall strength and rigidity of the truck bed may be increased, and of allowing mounting/removal of the attachment without requiring disassembly of a truck bed relative to a truck frame.

DRAWINGS

The nature and mode of operation of the present invention will now be more fully described in the following detailed description taken with the accompanying drawings wherein:

FIG. 2 is a top plan view of a bed mounting plate;

FIG. 3 is an elevational view of a frame mounting plate;

FIG. 4 is a fragmentary sectional view showing the attachment in mounted condition;

FIG. 5 is a perspective view of a mounting plate assembly fixed in association with a truck bed and frame.

DETAILED DESCRIPTION

Figure 1:
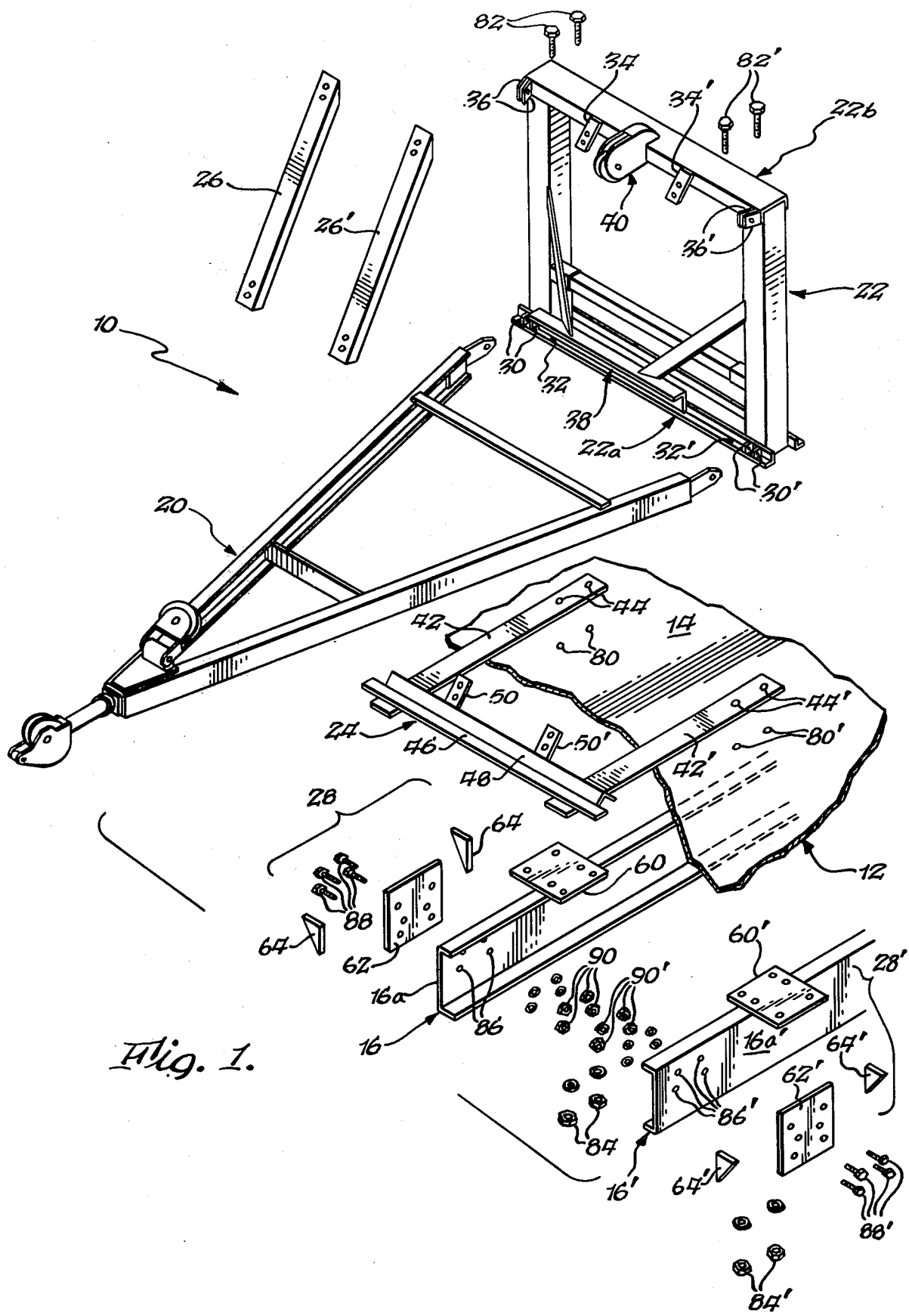
FIG. 1 is a fragmentary, partially exploded perspective view of a wrecker attachment of the present invention in association with the bed and frame of a truck.

Reference is first made to FIG. 1, wherein a wrecker attachment of the present invention is generally designated as 10 and shown in association with a truck 12, including a bed 14 arranged above a frame formed in part by a pair of transversely spaced frame members 16 and 16' arranged to extend lengthwise of the bed. Truck 12 may for example be of the type commonly referred to as a pickup truck, wherein frame members 16 and 16' are typically formed as U-shaped channels arranged in a facing relationship and bed 14 is maintained in a vertically spaced relationship relative thereto, as depicted in FIG. 4, by transversely extending weldments 18, which are clamped downwardly against the frame members by bed mounting bolts, not shown.

Attachment 10 would preferably be fabricated and marketed in kit or knock-down form and of a design permitting same to be quickly assembled by a user on a user's truck. More specifically, attachment 10 preferably includes separately fabricated main assemblies comprising a boom assembly 20; a back post assembly 22, which serves to mount the boom assembly; a floor plate assembly 24, which serves to positionally locate the back post assembly on bed 14 and brace same relative thereto with the aid of bolt affixed brace members 26 and 26'; and mounting plate assemblies 28 and 28', which are adapted to clamp the back rest and floor plate assemblies relative to the truck bed and rigidly secure same to frame members 16 and 16'. While the boom and back rest assemblies are shown in assembled condition in FIG. 1, such assemblies may in order to facilitate manufacture and shipment of attachment 10, be comprised of sub-assemblies and intended to be bolt or otherwise connected together by a user. Also, it will be understood that attachment 10, as marketed, may additionally include items of known manufacture, such as for instance, a winch, winch cable, winch operating controls and a sling or towing harness, which are omitted from FIG. 1 in order to simplify the drawings. Further, it will be understood that subsequent to mounting of attachment 10 on truck 12 in the manner to be described, it is functionally equivalent to prior wrecker units, such as for instance, that described in U.S. Pat. No. 3,888,368, whose disclosure is specifically incorporated by reference herein.

Reference is again made to FIG. 1, wherein back post assembly 22 is shown as generally including horizontally disposed base portion 22a provided with pairs of apertured, transversely spaced flanges 30 and 30', which serve to support boom assembly 20 for vertical pivotal movement, and groups of transversely spaced mounting apertures, such as for example, pairs of such apertures, wherein only one aperture of each pair is shown and designated respectively as 32 and 32'; and an upstanding post or standard portion 22b, which is of inverted U-shaped construction and provided with a pair of transversely spaced, upper brace mounting flanges 34 and 34', pairs of transversely spaced flanges 36 and 36' for use in attachment of boom assembly supporting cables or chains, not shown, a bracket sub-assembly 38 for use in mounting an operating winch, not shown, and a sheave sub-assembly 40 for guiding a winch cable, not shown. It will be understood that the spacing between groups or pairs of mounting apertures 32 and 32' is such that they may be proximately located one group in vertical association with each of frame members 16 and 16', as depicted in the drawings.

Floor plate assembly 24 is of generally U-shaped plan view configuration and includes a pair of parallel side floor mounting plates 42 and 42', which are intended to be laid flatwise on bed 14 in an essentially equidistant and parallel relationship to frame members 16 and 16', respectively, and provided at their front ends with pairs of mounting apertures 44 and 44' intended to be arranged for alignment with mounting apertures 32 and 32', respectively, of back post assembly 22. The rearwardly disposed ends of plates 42 and 42' are joined by transversely extending connecting plate means in the form of a back brace plate 46 and an angle iron 48 from which upstands a pair of transversely spaced, apertured lower brace mounting flanges 50 and 50'. As will be apparent, mounting flanges 50 and 50' are intended to be arranged for alignment with upper brace mounting flanges 34 and 34' for bolt attachment of opposite ends of brace members 26 and 26', when mounting apertures 42, 32 and 42', 32' are disposed in alignment.

Mounting plate assemblies 28 and 28' are of mirror image construction and accordingly, only assembly 28 will be specifically described and like parts of assembly 28' designated by like primed numerals. Assembly 28 includes a mounting plate 60, which is best shown in FIG. 2; a frame mounting plate 62, which is best shown in FIG. 3; and a pair of generally triangularly shaped gusset plates 64 and 64.

Bed mounting plate 60 is characterized as having a plurality of pairs of adjustment mounting openings, e.g. 66, 68 and 70, wherein the openings of each pair are spaced apart for alignment selectively with mounting apertures 32 and 44, and the pairs of mounting openings are parallel and spaced at different distances from each of opposite end edges 60a and 60b of the bed mounting plate. A bed mounting plate having a length of about 8 inches between end edges 60a and 60b, and a spacing of $\frac{3}{4}$, 4 1/5 and 7$\frac{1}{2}$ inches between end edge 60a and the centers of openings 66, 68 and 70, respectively, together with a spacing of about 33 inches between mounting apertures 32 and 32' has been found sufficient to accommodate attachment 10 for mounting on pickup trucks of recent U.S. manufacture having differing spacings between their respective frame members. Assembly 10 may be accommodated to essentially all manufacturers of such trucks by increasing the number of pairs of mounting apertures provided for each group of apertures in the illustrated back post and floor plate assemblies, but alternatively it would be preferably to market several sizes of the present wrecker attachments in order to avoid weakening of base portion 22a or floor mounting plates 42 and 42' by the inclusion therein of additional mounting apertures.

Now referring to FIG. 3, it will be understood that frame mounting plate 62 is also characterized as having a plurality of pairs of adjustment mounting openings, e.g. 72, 74 and 76, which are arranged in a non-uniform pattern intermediate plate bounding or side edges 62a–62d. In the illustrated preferred construction, plate 62 is essentially square having dimensions of approximately 8×8 inches, and provided with center to center spacings of about 6, 4 and 5 inches between pairs of apertures 72, 74 and 76, respectively, and spacings between bounding edge 62a and the centers of pairs of apertures 72, 74 and 76 of approximately 1, 2$\frac{3}{4}$ and 5$\frac{1}{2}$ inches, respectively. While pairs of apertures 72, 74 and 76 are preferably equidistant from a line bisecting plate edges 62a and 62c, they may be offset, as a group, relatively towards either of edges 62b or 62d to provide an even greater capacity for adjustment. This construction has again been found sufficient to accommodate attachment 10 for mounting on pickups of recent U.S. manufacture having differing spacings between their frame members and beds.

The wrecker attachment of the present invention may be mounted on bed 14 of a pickup truck by the following procedure. As a first step, floor plate assembly 24 may be laid flatwise on bed 14 and approximately positioned relative to frame members 16 and 16' with care being taken to insure that mounting apertures 44 and 44' are positioned to avoid interference with the truck's electrical wiring, gas tank, gas line, brake lines, etc. during subsequent mounting of assemblies 28 and 28'. After this has been accomplished, mounting holes 80 and 80' are drilled in bed 14 using the previously positioned apertures 44 and 44' as a guide; back post assembly 22 positioned on floor plate assembly 24; and bolts 82 and 82' passed downwardly through aligned pairs of apertures/holes 32, 44, 80 and 32' and 32', 44', 80'. Brace members 26 and 26' may be bolt connected to assemblies 22 and 24 at any convenient time during the attachment assembly operation.

Assemblies 28 and 28' are then each assembled in the following sequence to be hereinafter specifically described with reference to assembly 28. In this connection, bed mounting plate 60 is first positioned beneath truck bed 14 such that an appropriate pair of its mounting openings 66, 68 or 70, when aligned to receive bolts 82, will permit a substantial portion of the plate to extend past the vertically extending mounting or outer side surface 16a of an associated frame member 16, as generally depicted in FIGS. 4 and 5, and nuts 84 applied to temporarily bolt the bed mounting plate in place. Frame mounting plate 62 is then laid flatwise on surface 16a and positioned such that a desired number, and preferably four of its mounting openings, e.g. 72 and 74, overlie such surface and any one of its bounding edges, e.g. 62c, underengages with the previously installed bed mounting plate 60. Mounting holes 86 are then drilled through surface 16a in alignment with the desired number of mounting openings, using plate 62 as a guide, and the plate then temporarily clamped in place by bolts 88 and nuts 90. Plates 60 and 62 are then welded together with the use of gusset plates 64 for reinforcing purposes. In this respect, it is convenient to first tack weld plates 60 and 62 and gusset plates 64 to define a temprary T-shaped structures, while such plates remain in their temporarily clamped or installed positions, and then unbolt such structure relative to bed 14 and frame member 16 for final welding in a vise, on a workbench or at any other convenient location. The fully welded structure is then returned to its original position and securely bolted in place, whereby to clamp assemblies 22, 24 and 28 to bed 14 and to frame member 16. Assembly of attachment 10 may then be completed by connecting boom assembly 20 to back post assembly 22, and fitting in place remaining elements of the attachment kit, such as the winch, winch cable, etc.

It will be understood that the provision of a plurality of pairs of mounting openings in bed mounting plates 60 and 60', which are individually spaced at different distances from at least one and preferably opposite end edges thereof, provides a substantial number of possible adjusted positions of the bed mounting plates relative to bed mounting holes 80 and 80' in order to accommodate assembly 10 for differences in spacing between frame members 16 and 16', as well as human error in drilling such bed mounting holes, and insure that a sufficient extent of each of the bed mounting plates projects beyond mounting surfaces 16a and 16a' to permit a complete weld connection to be formed between gusset plates 64 and 64' and their associated bed mounting plates and to provide sufficient clearance for manipulating nuts 84 and 84'. The provision in the illustrated construction of three pairs of mounting openings permits six adjusted positions of each of bed mounting plates 60 and 60', which is believed to be more than sufficient to accommodate attachment 10 for typical differences in construction of such frame members from that illustrated in the drawings and reasonably expected errors in placement of the bed mounting holes 80 and 80'. In a like manner, the provision of frame mounting plates 62 and 62' with three pairs of apertures arranged in the pattern illustrated in the drawings permits any of side edges 62a-62d to be placed in underlying engagement with bed mounting plates 60 and 60', as required to position a desired number of their mounting openings 72, 74 and 76 in proper alignment with the mounting surfaces 16a and 16a'. In the illustrated construction, there are seven possible positions of frame mounting plates 62 and 62', but more or less may be provided by varying the number of pairs of mounting openings, as well as the placement of such openings relative to each other and the side edges of the frame mounting plates.

While it would be of course possible to form both the bed and frame mounting plates with a substantially larger number of pairs of openings than that illustrated in the drawings, to do so would be undesirable from both the standpoint of weakening the respective plates and greatly increasing the cost of fabricating same.

While a preferred embodiment of the present invention has been described together with several minor variations thereof, various further variations or modifications will likely occur to those skilled in the art in view of the foregoing description. As by way of example, it is contemplated that the floor plate assembly may be omitted and the back post assembly clamped directly to a truck bed with means other than that illustrated being employed to afford bracing for the back post assembly. Further, as will be apparent, the novel mounting arrangement of the present invention may be adapted for use in mounting diverse types of attachments on the beds of pickup trucks. Thus, it is intended that the present invention encompass all such variations and modifications, as well as substitutions of parts or elements, falling within the scope of the appended claims.

What is claimed is:

1. A wrecker attachment mounted on the bed of a pickup truck having an underlying supporting frame formed in part by a pair of transversely spaced frame members extending lengthwise of said bed and comprising in combination:

said attachment includes a boom assembly; a back post assembly for mounting said boom assembly; a floor plate assembly for positionally locating and bracing said back post assembly relative to said bed; a pair of brace members, said back post assembly having a horizontally disposed base portion and an upstanding post portion of inverted U-shaped configuration, said base portion mounting said boom assembly, said post portion mounting a pair of transversely spaced upper brace mounting flanges, said floor plate assembly is of a U-shaped plan view configuration and includes parallel side floor mounting plates laid flatwise on said bed and connecting plate means for joining rearwardly disposed ends of said side floor mounting plates and mounting a pair of transversely spaced lower brace mounting flanges, said base portion extending transversely of said side floor mounting plates adjacent front ends thereof, said pair of brace members having opposite ends thereof connected to said upper and lower brace mounting flanges, said base portion and said front ends of said floor mounting plates having groups of mounting apertures proximately located one group in vertical association with each of said frame members; attachment mounting bolts passed downwardly through said groups of mounting apertures and through mounting holes formed in said bed in alignment with said groups of mounting apertures; and a pair of mounting assemblies arranged beneath said bed one in association with each of said frame members and its associated group of mounting apertures, said assemblies each having a bed mounting plate arranged to underengage said bed and formed with mounting openings disposed to receive said bolts passing through an associated group of mounting apertures for clamping said base portion and said floor mounting plates to an upper surface of said bed and said bed mounting plate to a lower surface of said bed, a frame mounting plate fixed to depend from said bed mounting plate in surface engagement with an adjacent one of said frame members to define a generally T-shaped structure, said frame mounting plate having a plurality of mounting openings aligned with mounting holes in said adjacent one of said frame members, assembly mounting bolts passed through said mounting openings of said frame mounting plate and aligned mounting holes in said adjacent one of said frame members for clamping said frame mounting plate to said adjacent one of said frame members, and gusset plates edge connected to said bed and frame mounting plates for rigidifying said structure.

2. A wrecker attachment for mounting on the bed of a pickup truck having an underlying supporting frame formed in part by a pair of transversely spaced frame members extending lengthwise of said bed and having vertically extending surfaces, said attachment comprising: a boom assembly; a back post assembly for mounting said boom assembly, said back post assembly including a horizontally disposed base portion and an upstanding post portion of inverted U-shaped configuration, said post portion mounting a pair of transversely spaced upper brace mounting flanges; a floor plate assembly for positionally locating and bracing said back post assembly relative to said bed, said floor plate assembly is of a U-shaped plan view configuration and includes parallel side floor mounting plates to be laid flatwise on said bed and connecting plate means for joining rearwardly disposed ends of said side floor mounting plates and mounting a pair of transversely spaced lower brace mounting flanges, said base portion and front ends of said side floor mounting plates having groups of mounting apertures arranged for relative vertical alignment and for positioning in proximate vertical association one with each of said frame members and for receiving mounting bolts passed downwardly through said apertures and through mounting holes provided in said bed; a pair of brace members having their opposite ends connected to said upper and lower brace mounting flanges; and a pair of mounting plate assemblies associated one with each of said groups of mounting apertures and its associated frame member, each said mounting plate assembly including a bed mounting plate having mounting openings for receiving said mounting bolts extending through its associated group of apertures for clamping said bed mounting plate, said floor plate assembly and said back post assembly to said bed, and a frame mounting plate provided with mounting openings arranged to receive mounting bolts for clamping said frame mounting plate to said associated frame member with an edge of said frame mounting plate fixed to said bed mounting plate to define a T-shaped structure.

3. A wrecker attachment for mounting on the bed of a pickup truck having an underlying supporting frame formed in part by a pair of transversely spaced frame members extending lengthwise of said bed and having vertically extending surfaces, said attachment comprising: a boom assembly; a back post assembly for mounting said boom assembly; a floor plate assembly for positionally locating and bracing said back post assembly relative to said bed, said back post and floor plate assemblies having groups of mounting apertures arranged for relative vertical alignment and for positioning in proximate vertical association one with each of said frame members and for receiving mounting bolts passed downwardly through said apertures and through mounting holes provided in said bed, each of said groups of mounting apertures includes a pair of mounting apertures and a pair of mounting plate assemblies associated one with each of said groups of mounting apertures and its associated frame member, each said mounting plate assembly including a bed mounting plate having mounting openings for receiving bolts extending through its associated group of apertures for clamping said bed mounting plate, said floor plate assembly and said back post assembly to said bed, said bed mounting plate is formed with a plurality of pairs of said mounting openings, wherein the spacing between mounting openings of each pair corresponds to the spacing between mounting apertures of each pair, and said pairs of mounting openings are parallel and spaced at different distances from opposite ends of said bed mounting plate, and a frame mounting plate provided with mounting openings arranged to receive mounting bolts for clamping said frame mounting plate to said associated frame member with an edge of said frame mounting plate fixed to said bed mounting plate to define a T-shaped structure.

4. An improvement according to claim 3, wherein said mounting openings of said frame mounting plate are arranged as plural pairs of openings having differing center to center spacings between mounting openings of each pair, and said pairs of mounting openings of said frame mounting plate are parallel and arranged at different distances from opposite end edges of said frame mounting plate.

5. An attachment according to claim 2, 3 or 4, wherein said back post assembly includes a horizontally disposed base portion and an upstanding post portion of inverted U-shaped configuration, said post portion mounting a pair of transversely spaced upper brace mounting flanges; said floor plate assembly is of a U-shaped plan view configuration and includes parallel side floor mounting plates to be laid flatwise on said bed and connecting plate means for joining rearwardly disposed ends of said side floor mounting plates and mounting a pair of transversely spaced lower brace mounting flanges, said base portion being sized to extend transversely of said side floor mounting plates adjacent front ends thereof to position said groups of mounting apertures extending through said base portion and said front ends of said side floor mounting plates in vertical alignment, and said attachement additionally including a pair of brace members opposite end connected to said upper and lower brace mounting flanges.

* * * * *